Dec. 15, 1959     D. W. PROWSE ET AL     2,917,207
CONTROL OF MECHANICAL FEEDING MEANS
Filed May 5, 1958
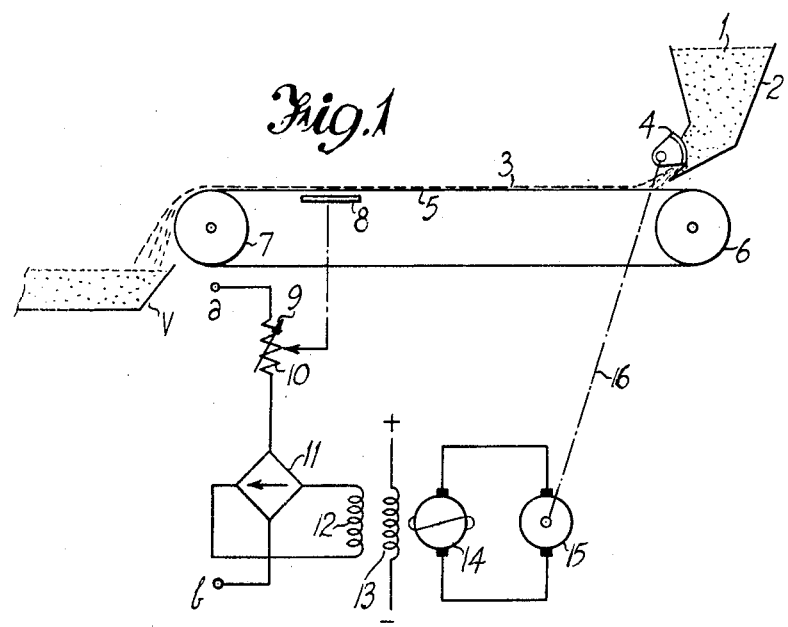
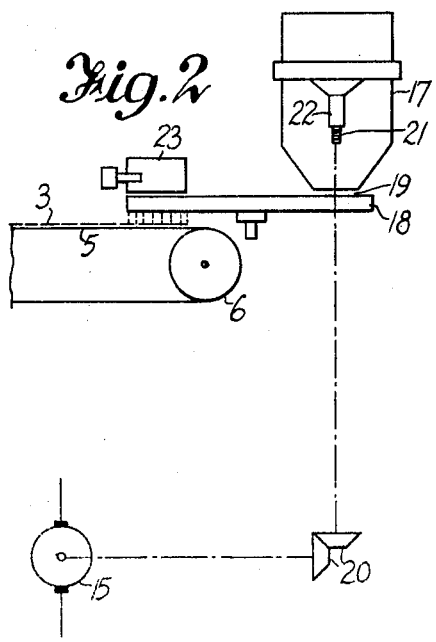
INVENTORS
DONALD WINDSOR PROWSE
RAYMOND GEORGES RAYDEN
ATTORNEY

United States Patent Office 2,917,207
Patented Dec. 15, 1959

2,917,207

CONTROL OF MECHANICAL FEEDING MEANS

Donald Windsor Prowse and Raymond Georges Rayden, Rugby, England, assignors to The British Thomson-Houston Company Limited, London, England, a company of Great Britain Application May 5, 1958, Serial No. 732,998

2 Claims. (Cl. 222—55)

This invention relates to systems for feeding loose material, such as granular or powder material, and aims at providing an improved means for controlling the quantity of material carried by the system to a working or processing station per unit time. The invention, although not so limited, is particularly useful where the material has to be added in a predetermined proportion to another material, the two materials being supplied to one and the same station under a common general control known per se which determines the total weight of the two materials delivered per unit time, and it will be understood that in such case the present invention provides an additional control for each conveyor to steady the output of the conveyor.

An important advantage of the invention is that it does not require a separate feeder means, such as a turntable or second conveyor located upstream of the conveyor above referred to, but can be readily employed in a plant where the material is supplied to the conveyor above mentioned directly from a container, such as a hopper.

From a general aspect the present invention resides in a mechanical feeding system comprising a conveyor, a container, a passage through which a flow of loose material is fed continuously under gravity action from the container to the conveyor, a first means for measuring the weight of material moved by the conveyor per unit time, and a second means controlling automatically the free cross-section area of said passage in dependence upon the measuring results obtained by the first means wherein an amplidyne generator is connected to an electric motor for driving the second means and is provided with a control field winding which is energized in accordance with the weight measured by the first means.

In this specification the term conveyor is meant to embrace also a turntable or any other known conveyance for transporting loose material in a continuous manner as generally represented by a belt or band conveyor.

Two preferred embodiments of the invention will now be described by way of example and with reference to Figs. 1 and 2 of the accompanying drawing which illustrates the invention in conjunction with a band conveyor and turntable respectively.

As can be seen from Fig. 1, loose material 1 flows under gravity action from a hopper 2 through a discharge opening having its free cross-section controlled by a shutter 4, so as to form a level 3 on an endless conveyor band 5 which runs over pulleys 6, 7 and carries the material to a vat V, the pulleys 6, 7, being rotated by means known in the art and not shown.

A beam 8 or other sensing member of a conventional continuous weighing equipment, other details of which are not shown for the sake of clarity, is arranged to be displaced in accordance with the weight of material carried on and delivered by the conveyor per unit time. The beam 8 is interconnected with a movable member 9 the displacement of which causes signals in a control circuit. For instance the core of a variable reactor 10 may form the movable member. The reactor is supplied through terminals a and b from an A.C. source. The output of the variable reactor serves to energise through a rectifier 11 a control field winding 12 of an amplidyne generator 14 which has a bias field winding 13 supplied from a D.C. source to produce a magnetic field opposing the field produced by winding 12. An electric motor 15 is supplied from the amplidyne generator 14 to position through interconnecting linkage means 16, which may include a reduction gear, the shutter 4.

The arrangement is such that when the actual rate of feeding corresponds to that required the signal supplied through the variable reactor excites the field winding 12 of the amplidyne to produce a field which is opposed to and cancels the field produced by the winding 13, so that the amplidyne 14 has zero output, the motor 15 supplied from the amplidyne will not rotate, and the shutter 4 will be retained in its position. If the feeding rate differs from the required value the beam 8 moves, the impedance of the reactor 10 is changed, the field due to the signal supplied from the reactor to the field winding 12 is not cancelled by the field produced by winding 13, and the amplidyne provides now an output suitable to rotate the motor 15 to re-position the shutter 4, thereby to change the weight of material per unit length of conveyor 5, the positions of the beam 8 and member 9, until the desired feeding rate is re-established when the signals from the reactor will again cause zero amplidyne output and the member 4 will be at rest.

In another embodiment illustrated by Fig. 2 the sensing element and electric control circuit correspond to those of Fig. 1. However the motor 15 serves now to control the position of a container or hopper 17 arranged above a turntable 18 so as to form a gap between an opening at the bottom of the container or hopper and the surface of the turntable, which gap determines by its dimension perpendicular to the table surface the rate of discharge of material to the turntable.

Any suitable force transmitting means known in the art could serve for the mechanical interconnection between the motor 15 and the hopper 17. In the present case there is shown for instance a bevel gear 20 driving a screw thread 21 rotating in a nut 22 fixed to the hopper 17. Such interconnection preferably includes a reduction gear, and, in addition to or in lieu of the step-down effect of the nut and screw thread arrangement a worm gear may be used, for instance in the place of the bevel gearing. In this manner the height of material on the turntable is controlled. A plough or blade 23 sweeps the material from the turntable on to the conveyor belt 5. As the height of material on the turntable is controlled, the delivery at the end of the conveyor is controlled in dependence upon the sensing member, all other conditions being unchanged.

It will be understood that modifications are possible without departure from this invention as defined by the appended claims. Where additional control, dependent upon other variables, for instance the operation of other feeders supplying the same vat with other materials, is desired, the speed of the turntable and the position of the blade or plough may be varied to perform such additional control operations. Instead of the amplidyne shown by way of example other amplifying means known per se, such as a push pull arrangement of magnestats, can be used.

What we claim is:

1. A mechanical feeding system comprising a conveyor, a container, a passage through which a flow of loose material is fed continuously under gravity action from the container to the conveyor, a first means for measuring the weight of material moved by the conveyor per unit time, a second means controlling automatically the free cross-section area of said passage in dependence upon the measuring results obtained by the first means; an electric motor connected to drive said second means, an amplidyne generator having a control field winding connected for energization in accordance with the weight measured by said first means; and means connecting said amplidyne generator for energizing said electric motor.

2. A system as claimed in claim 1, wherein said first means includes a variable reactor, a rectifier, and means connecting said amplidyne generator control field winding through said rectifier to said variable reactor.

References Cited in the file of this patent

UNITED STATES PATENTS

| | | |
|---|---|---|
| 2,343,722 | Wagner | Mar. 7, 1944 |
| 2,366,075 | Weyandt | Dec. 26, 1944 |